(12) United States Patent
Yamaguchi

(10) Patent No.: US 6,659,567 B2
(45) Date of Patent: Dec. 9, 2003

(54) WHEEL BALANCE WEIGHT AND PROCESS FOR MANUFACTURING THE SAME

(75) Inventor: Yutaka Yamaguchi, Higashikamo-gun (JP)

(73) Assignee: Toho Kogyo Co., Ltd., Aichi-ken (JP)

( * ) Notice: Subject to any disclaimer, the term of this patent is extended or adjusted under 35 U.S.C. 154(b) by 0 days.

(21) Appl. No.: 10/184,926

(22) Filed: Jul. 1, 2002

(65) Prior Publication Data

US 2003/0127906 A1 Jul. 10, 2003

(30) Foreign Application Priority Data

Jan. 10, 2002 (JP) ........................... 2002-003689

(51) Int. Cl.$^7$ .................... B60B 1/00; B32B 33/00
(52) U.S. Cl. ........................ 301/5.21; 428/40.1
(58) Field of Search ............... 301/5.21, 5.22; 428/40.1, 40.9, 41.7, 41.8; 74/573 R

(56) References Cited

U.S. PATENT DOCUMENTS

| | | | | |
|---|---|---|---|---|
| 2,029,132 A | * | 1/1936 | Skelton | 301/5.21 |
| 2,292,024 A | * | 8/1942 | Dreher | 428/317.3 |
| 3,960,409 A | * | 6/1976 | Songer | 301/5.21 |
| 5,959,205 A | * | 9/1999 | Yamaya et al. | 73/468 |
| 6,260,929 B1 | * | 7/2001 | Oba et al. | 301/5.21 |
| 6,286,906 B1 | * | 9/2001 | Nagashima et al. | 301/5.21 |
| 6,364,421 B1 | * | 4/2002 | Pursley | 301/5.21 |
| 6,413,626 B1 | * | 7/2002 | Wollner | 428/317.3 |

FOREIGN PATENT DOCUMENTS

EP 1 067 310 1/2001
EP 1 128 176 8/2001

OTHER PUBLICATIONS

Database WPI, Section PQ, Week 200313, Derwent Publications Ltd., London, GB; Class Q63, AN 2003–135321, XP002236534 & JP 202 372103 A (Taiho Kogyo Co Ltd.) Dec. 26, 2002, abstract.
Patent Abstracts of Japan, vol. 2002, No. 10, Oct. 10, 2002 & JP 2002 168295 A (Nakamura Koujirou), Jun. 14, 2002.
Patent Abstract of Japan, vol. 2000, No. 20, Jul. 10, 2001 and JP 2001 065639 A (Taiho Kogyo Co Ltd.; Toho Kogyo KK) Mar. 16, 2001.
Patent Abstracts of Japan, vol. 015, No. 354 (M–115), Sep. 6, 1991 & JP 03 139401 A (Hiroyuki Kanai) Jun. 13, 1991.

* cited by examiner

*Primary Examiner*—S. Joseph Morano
*Assistant Examiner*—Long Bao Nguyen
(74) *Attorney, Agent, or Firm*—Jacobson Holman PLLC

(57) ABSTRACT

A wheel balance weight includes a weight and a double-sided tape. The weight is formed as a substantially strip shape, is made from a ferrous alloy, and has opposite top and bottom surfaces and at least a groove. The groove is formed in the bottom surface of the weight, and crosses in the width-wise direction thereof being substantially perpendicular to the longitudinal direction thereof. The double-sided tape has opposite adhesive surfaces being disposed back to back with each other. One of the opposite adhesive surfaces is to be bonded onto the bottom surface of the weight, and the other one of the opposite adhesive surfaces to be bonded onto an inner peripheral surface of a wheel. Accordingly, it is possible to curve the weight with less force. Hence, it is possible to install the wheel balance weight to a wheel with ease.

8 Claims, 3 Drawing Sheets

WHEEL BALANCE WEIGHT AND PROCESS FOR MANUFACTURING THE SAME

BACKGROUND OF THE INVENTION

1. Field of the Invention

The present invention relates to a wheel balance weight. In particular, it relates to a wheel balance weight which is installed to an inner peripheral surface of a rim in a wheel of a vehicle.

2. Description of the Related Art

In a wheel-assembled state; namely: in a state where a tire of an automobile, or the like, is assembled with a wheel, there arises a drawback in that, as the unbalance enlarges in the peripheral direction around the rotary shaft of the wheel assembly as well as in the direction of the rotary shaft of the wheel assembly, the vibrations, noises, and the like, generate when driving a vehicle.

The vibrations, noises, and so on, result from the unbalance in the wheel. Accordingly, the wheel is equipped with a wheel balance weight, which can cancel the unbalance. The installation position of the wheel balance weight to the wheel and the mass of the wheel balance weight are determined by measuring the unbalance of the wheel assembly with a special purpose measuring apparatus.

As one of the conventional wheel balance weights, there has been, for example, a wheel balance weight, which is installed to an inner peripheral surface of a rim in the wheel by bonding a substantially plate-shaped weight, having a predetermined mass, by means of an adhesive tape, etc.

When the conventional wheel balance weight is manufactured, the weight is formed as a flat plate shape. When it is installed to the wheel, the weight is curved along the inner peripheral surface of the rim in the wheel. Moreover, since the curvature of the conventional wheel balance weight depends on the curvature of the wheels to which it is installed, it is determined appropriately.

In the conventional wheel balance weight, the weight has been formed of lead, which is one of soft materials. The weight, which is formed of lead, can be readily processed, and can be readily curved with a manual labor.

However, it has been known that lead put a large load onto environment when it is abolished. Consequently, ferrous alloys, which put a less load onto environment, have come to be employed as a material for the weight.

Yet, a wheel balance weight, which uses a weight being formed of a ferrous alloy, suffers from a problem in that it requires an enormous force when it is installed to a wheel.

Specifically, when such a wheel balance weight is installed at a predetermined position in a wheel, it is necessary to curve the weight, which is formed of a ferrous alloy. However, since such a weight exhibits a high hardness, it has been necessary to exert a great force to curve it.

Hence, in order that such a weight can be curved with a gentle force, another wheel balance weight has been devised which has a weight with a groove formed in the top surface. Here, the "top surface" refers to a surface of the weight onto which no double-sided tape adheres, and which faces the axis of a wheel when the wheel balance weight is installed to the wheel.

In such a wheel balance weight, the weight has a less thickness at the portion in which the groove is formed than at the other portions in which no groove is formed. Accordingly, when a stress is given to the weight to curve it, the given stress concentrates at the portion in which the groove is formed. As a result, the weight can be curved with a minor force.

However, when the weight is bent excessively, the conventional wheel balance weight, which uses the weight with the groove formed in the top surface, suffers from a problem in that the weight fractures at the groove.

Moreover, in such a conventional wheel balance weight as well, it has been required to reduce the force needed for curving the weight when it is installed to a wheel.

When the weight with the groove formed in the top surface is bent, the weight is compressed on the top surface side and is extended on the bottom surface side. Since ferrous alloys, which are used in the weight, exhibit a low malleability, it is necessary to exert a large force in order that the weight is fully extended on the bottom surface side. Thus, it has been needed to lessen the enormous force.

SUMMARY OF THE INVENTION

The present invention has been developed in view of the aforementioned circumstances. It is therefore an object of the present invention to provide a wheel balance weight, which can be readily installed to a wheel.

In order to carry out the object, the inventors of the present invention repeatedly investigated the ways for curving weights of wheel balance weights with ease. As a result, they found out that it was possible to achieve the object by making a weight with a groove formed in a bottom surface thereof. Thus, they completed the present invention.

For example, a wheel balance weight according to the present invention is characterized in that it comprises: a weight being formed as a substantially strip shape, being made from a ferrous alloy, having opposite top and bottom surfaces and at least a groove, the groove being formed in the bottom surface of the weight and crossing in the width-wise direction thereof being substantially perpendicularly to the longitudinal direction thereof; and a double-sided tape having opposite adhesive surfaces, being disposed back to back with each other, one of the opposite adhesive surfaces to be bonded onto the bottom surface of the weight, the other one of the opposite adhesive surfaces to be bonded onto an inner peripheral surface of a wheel.

In the present wheel balance weight, since the groove is formed in the bottom surface of the weight, it is possible to curve the weight with a less force. Hence, it is possible to install the present wheel balance weight to a wheel with ease.

A process according to the present invention is adapted for manufacturing the present wheel balance weight, and is characterized in that it comprises the steps of: forming a weight being formed as a substantially strip shape, being made from a ferrous alloy and having opposite surfaces; forming a groove in one of the opposite surfaces of the resulting weight by pressing the one of the opposite surfaces thereof with a punch, the groove crossing in the width-wise direction of the weight being substantially perpendicularly to the longitudinal direction thereof, wherein a plastic deformation at opposite ends of the weight in the width-wise direction thereof is less than a plastic deformation at a central portion of the weight in the width-wise direction thereof; and applying a double-sided tape, having opposite adhesive surfaces, to the weight so as to adhere one of the opposite adhesive surfaces onto the one of the opposite surfaces of the weight with the groove formed therein.

In accordance with the present process for manufacturing the present wheel balance weight, it is possible to inhibit burrs, flashes, and the like, from protruding at the ends of the groove when the punch is pressed onto the one of the opposite surfaces of the weight in order to form the groove. Hence, it is possible to manually handle the present wheel balance weight, which has been manufactured by the present manufacturing process, safely.

BRIEF DESCRIPTION OF THE DRAWINGS

A more complete appreciation of the present invention and many of its advantages will be readily, obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
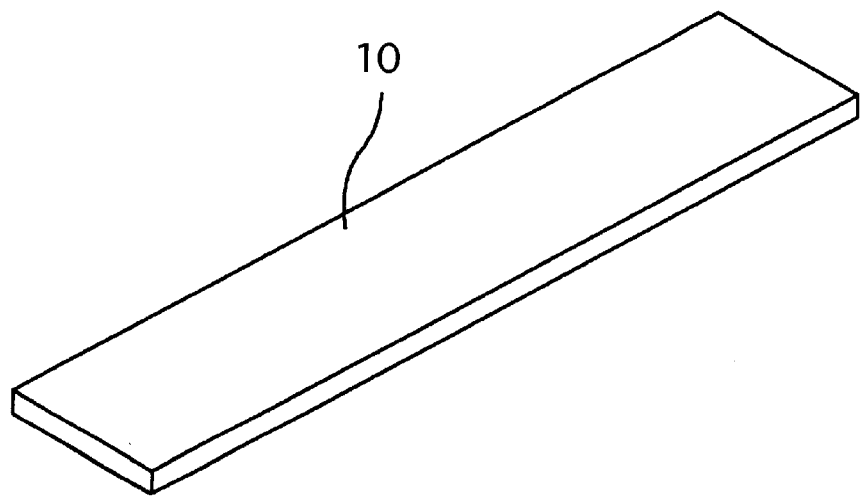
FIG. 1 is a perspective view for illustrating a metallic plate which was used in an example of a wheel balance weight according to the present invention.

Having generally described the present invention, a further understanding can be obtained by reference to the specific preferred embodiments which are provided herein for the purpose of illustration only and not intended to limit the scope of the appended claims.

(Wheel Balance Weight)

A wheel balance weight according to the present invention comprises a weight and a double-sided tape.

The weight is formed substantially as a strip shape, is being made from a ferrous alloy, and has opposite top and bottom surfaces. When the present wheel balance weight is installed to a wheel, the weight cancels the unbalance in a wheel assembly. As the ferrous alloy for making the weight, it can be any alloy in which iron is a major component. For example, it is possible to name pure iron, steel, stainless steel, and so on.

The double-sided tape has two adhesive surfaces, which are disposed back to back with each other. One of the adhesive surfaces is to be bonded onto the bottom surface of the weight. The other one of the adhesive surfaces is to be bonded onto an inner peripheral surface of a wheel. The double-sided tape fastens the weight onto the wheel. The double-sided tape is not limited in particular. For instance, it is possible to use the double-sided tapes, which have been used in the conventional wheel balance weights.

In the present wheel balance weight, the weight has at least a groove, which is formed in the bottom surface of the weight and which crosses in the width-wise direction thereof being substantially perpendicular to the longitudinal direction thereof.

Since the weight has the groove, the thickness of the weight is reduced partially at the portion in which the groove is formed. In other words, the weight exhibits a lowered rigidity at the portion in which the groove is formed than at the other portions which are free from the groove or which have a larger thickness. Accordingly, when the present wheel balance weight is curved along an inner peripheral surface of a wheel, the weight can be bent at the portion in which the groove is formed. Thus, it is possible to curve weight with less force.

Note that the weight has the groove which is formed in the bottom surface. Hence, when the present wheel balance weight is installed to a wheel, it is possible to curve the weight along an inner peripheral surface of a wheel with ease. In particular, when the weight is curved, the weight is compressed on the top surface side, and is extended on the bottom surface side. Since the groove is formed in the bottom surface, the width of the groove is widened when the weight is curved. When the width of the groove is widened, the length of the weight is prolonged on the bottom surface side. This phenomenon implies that the weight is not adversely affected by the low ductility of a ferrous alloy which makes the weight, and that the weight can be curved with a reduced force as well.

Further, in the present wheel balance weight, since the groove is formed in the bottom surface of the weight, it is possible to make the top surface of the wheel smooth or free from irregularities. Thus, it is possible not only to upgrade the appearance of the present wheel balance weight, but also to effect an advantage in that finger tips of operators are inhibited from being hurt by such irregularities during the installation of the present wheel balance weight.

Furthermore, the groove can preferably have a bottom surface which extends substantially parallel to the top surface of the weight. When the groove has such a bottom surface, it is possible to bend the weight with ease. In particular, since the weight has a reduced thickness partially at the portion over which the bottom surface extends, it is possible to bend the weight with a gentle force when the weight is curved.

Moreover, since the groove has the bottom surface, it is possible to secure a sufficient marginal portion between two neighboring heavy-thickness portions of the weight which are free from the groove. When the weight is curved to cause a plastic deformation, it is possible to absorb the deformation with the marginal portion. The deformation results from the movement of the texture in the plastic deformation of the weight. Specifically, when the weight is curved, the texture is compressed on the inner peripheral surface side of the curved weight. Accordingly, a convexity is produced by the movement of the texture. In this instance, since the groove has the bottom surface, it is possible to absorb the convexity with the portion at which the bottom surface is formed. In other words, the weight is hardly inhibited by the convexity (or the concentration of the texture) from being curved. As a result, it is possible to readily curve the present wheel balance weight when it is installed to a wheel.

In addition, excepting the extended bottom surface, inner peripheral surfaces of the groove can preferably be formed as a smooth arc shape. By forming the inner peripheral surfaces of the groove as an arc shape, it is possible to inhibit the stress from concentrating in the inner peripheral surfaces but to concentrate it in the bottom surface when the weight is curved.

The weight can preferably be curved along an inner peripheral surface of a wheel. The "wheel" herein designates a wheel to which the present wheel balance weight is installed. When the present wheel balance weight is installed to a wheel, the weight is likely to be curved because the weight is adapted to be curved in the aforementioned manner. Moreover, when the present wheel balance weight is installed to a wheel, the adherence is enhanced between the present wheel balance weight and the wheel. Thus, the present wheel balance weight is less likely to come off the wheel in service.

In the present wheel balance weight, surfaces of the weight can preferably be subjected to a surface treatment. When the surfaces of the weight are subjected to a surface treatment, it is possible not only to make the appearance of the weight neat but also to inhibit the weight, which is made from a ferrous alloy, from rusting. As for such a surface treatment, it is possible to name surface treatments, such as a zinc chromate treatment, a silver powder painting, a chromium plating, a baking zinc chromate composite film, and the like.

Except that the weight with the groove formed in the bottom surface is used, the present wheel balance weight is not limited in particular. It is possible to apply the arrangements similar to those of the conventional wheel balance weights to the present wheel balance weight.

For example, it is preferable to give an identification mark to the top surface of the weight of the present wheel balance weight. For instance, when the top surface is marked with a mass of the weight, it is possible to readily identify and select a weight which has a desired mass. It is not limited, either, in terms of the way to give the identification mark to the top surface of the weight.

Further, a process for manufacturing the present invention is not limited in particular, either. For example, it is possible to name the following manufacturing process, which comprises the steps of: preparing the weight in which the groove is formed on the bottom surface; and applying the double-sided tape onto the bottom surface of the weight.

Furthermore, it is not limited, either, in terms of how to prepare the weight with the groove formed in the bottom surface. For example, it is possible to name the following manufacturing process, which comprises the steps of: cutting out a plate-shaped member into a predetermined shape; and molding the resulting plate-shaped member by means, such as pressing, and the like.

(Manufacturing Process)

A process according to the present invention for manufacturing the present wheel balance weight comprises the steps of: forming a weight; forming a groove in the weight; and applying a double-sided tape onto the weight. In the weight forming step, a weight is prepared which is formed as a substantially strip shape, is made from a ferrous alloy and has opposite surfaces. In the groove forming step, a groove is formed in one of the opposite surfaces of the resulting weight by pressing the one of the opposite surfaces thereof with a punch. Moreover, in the groove forming step, a plastic deformation at opposite ends of the weight in the width-wise direction thereof is less than a plastic deformation at a central portion of the weight in the width-wise direction thereof. The resulting groove crosses in the width-wise direction of the weight, which is substantially perpendicularly to the longitudinal direction thereof. In the double-sided tape applying step, a double-sided tape, which has opposite adhesive surfaces, is applied to the weight so as to adhere one of the opposite adhesive surfaces onto the one of the opposite surfaces of the weight with the groove formed therein.

In accordance with the present manufacturing process, it is possible to inhibit burrs, flashes, and the like, from protruding at the ends of the groove when the punch is pressed onto the one of the opposite surfaces of the weight in order to form the groove.

Specifically, when a punch is pressed onto a weight in order to form a groove, a portion of the weight, which is pressed by the punch is compressed so that the densities adjacent to the inner peripheral surfaces of the resulting groove are heightened. However, when the pressing magnitude exerted by the punch is enlarged, it is impossible to absorb the pressing magnitude of the punch by the increment of the densities only. Accordingly, a plastic deformation arises in the one of the opposite surfaces of the weight onto which the punch is pressed. When the pressing magnitude of the punch is enlarged to cause the plastic deformation, the changes in the structure of a ferrous alloy appear as burrs, flashes, and so on. When the burrs, flashes, and the like, occur in the weight, there has been a problem in that operators are hurt by the burrs, flashes, and the like, when they handle the weight.

On the other hand, in accordance with the present production process, in the groove forming step, the deformations of the structure in the weight differ between the central portion and the opposite ends. Accordingly, the plastic deformation, which occurs in the greatly deformed portion, is absorbed by the portions at which the deformation is small. As a result, even when the groove is formed by pressing the weight with the punch, there arise no burrs, flashes, and so on, which protrude from the weight.

In the present manufacturing process, the weight forming step and the double-sided tape applying step are not limited in particular. For example, it is possible to use the means which have been used in the conventional processes for manufacturing the conventional wheel balance weights. Moreover, materials, which are used in the present manufacturing process, are not limited in particular, either.

In the groove forming step, the punch can preferably have a protrusion whose outer peripheral surface substantially conforms to an inner peripheral surface of the groove, and the protrusion can preferably have a larger thickness at a central portion thereof than a thickness at opposite ends thereof. When the punch has the protrusion, it is possible to securely form the groove in one of the opposite surfaces of the weight. When the protrusion has different thicknesses at the central portion and the opposite ends, it is possible to control the plastic deformations which occur when the punch is pressed onto the weight. The "central portion of the protrusion" herein specifies its part for forming the portion, which is adjacent to the central portion of the groove, being formed by the punch, in the width-wise direction. The "opposite portions of the protrusion" herein specify its parts for forming the portions, which are adjacent to the opposite ends of the groove, being formed by the punch, in the width-wise direction. The "thicknesses of the protrusion" herein specify its thicknesses, which correspond to the dimensions of the groove, being formed by the punch, in the width-wise direction.

In the double-sided tape applying step, the double-sided tape is applied so as to adhere one of the opposite adhesive surfaces onto the one of the opposite surfaces of the weight with the groove formed therein. The "one of the opposite surfaces of the weight" herein designates the one of the opposite surfaces of the weight in which the groove is formed. By thus applying the double-sided tape to the weight, it is possible to complete the present wheel balance weight in which the groove is formed in the bottom surface of the weight.

In the thus manufactured present wheel balance weight, the weight has the groove formed in the bottom surface. Hence, when the present wheel balance weight is installed to a wheel, it is possible to curve the weight along an inner peripheral surface of a wheel with ease. In particular, when the weight is curved, the weight is compressed on the top surface side, and is extended on the bottom surface side. Since the groove is formed in the bottom surface, the width of the groove is widened when the weight is curved. This phenomenon implies that the weight is not adversely affected by the low ductility of a ferrous alloy which makes the weight, and that the weight can be curved with a reduced force as well.

Further, in the thus manufactured present wheel balance weight, since the groove is formed in the bottom surface of the weight, it is possible to make the top surface of the wheel smooth or free from irregularities. Thus, it is possible not only to upgrade the appearance of the present wheel balance weight, but also to effect an advantage in that finger tips of operators are inhibited from being hurt by such irregularities during the installation of the present wheel balance weight.

Furthermore, the protrusion of the punch can preferably have a flat portion at its leading end at least. When the leading end of the protrusion has a flat portion, it is possible to form the groove in the one of the opposite surfaces of the weight so that the groove has a bottom surface which extends substantially parallel to the other one of the opposite surfaces of the weight. When the groove has a bottom surface which extends substantially parallel to the other one of the opposite surfaces of the weight, it is possible to bend the weight with ease. This is because, when the weight is curved, the curving occurs at the portion of such a bottom surface. In particular, since the weight has a reduced thickness partially at the portion over which the bottom surface extends, it is possible to bend the weight with a gentle force when the weight is curved.

Moreover, since the groove has the bottom surface, it is possible to secure a sufficient marginal portion between two neighboring heavy-thickness portions of the weight which are free from the groove. When the weight is curved to cause a plastic deformation, it is possible to absorb the deformation, with the marginal portion. The deformation results from the movement of the texture in the plastic deformation of the weight. Specifically, when the weight is curved, the texture is compressed on the inner peripheral surface side of the curved weight. Accordingly, a convexity is produced by the movement of the texture. In this instance, since the groove has the bottom surface, it is possible to absorb the convexity with the portion at which the bottom surface is formed. In other words, the weight is hardly inhibited by the convexity (or the concentration of the texture) from being curved. As a result, it is possible to readily curve the present wheel balance weight when it is installed to a wheel.

In addition, the protrusion of the punch can preferably be formed as a smooth arc shape. When the protrusion has a smooth arch shape, it is possible as well for the groove, which is formed in the one of the opposite surfaces of the weight, to have smooth inner peripheral surfaces. Hence, when the thus manufactured wheel balance weight is curved, it is possible to inhibit the drawbacks, which result from the concentration of stress, from taking place.

Further, when the protrusion has a flat portion at the leading end, excepting the bottom surface of the groove which is formed in the one of the opposite surfaces of the weight, inner peripheral surfaces of the groove are formed as a smooth arc shape. With such an arrangement, it is possible to inhibit the stress from concentrating in the inner peripheral surfaces but to concentrate it in the bottom surface when the weight is curved.

The present process for manufacturing the present wheel balance weight can further comprise the step of carrying out a surface treatment onto the surfaces of the weight. The surface treatment step can be carried out at any time before the double-sided tape applying step. The surface treatment step can preferably be carried out between the groove forming step and the double-sided tape applying step. When the surfaces of the weight are subjected to a surface treatment, it is possible not only to make the appearance of the weight neat but also to inhibit the weight, which is made from a ferrous alloy, from rusting. As for such a surface treatment, it is possible to name surface treatments, such as a zinc chromate treatment, a silver powder painting, a chromium plating, a baking zinc chromate composite film, and the like.

The present process for manufacturing the present wheel balance weight can preferably further comprise the step of curving the weight so as to go along an inner peripheral surface of a wheel. The "wheel" herein designates a wheel to which the present wheel balance weight is installed. By thus curving the weight in the curving step, the weight is likely to be curved when the present wheel balance weight, which is manufactured by the present manufacturing process, is installed to a wheel. Moreover, when the present wheel balance weight is installed to a wheel, the adherence is enhanced between the present wheel balance weight and the wheel. Thus, the present wheel balance weight is less likely to come off the wheel in service. The curving step can be carried out at any time, but can preferably be carried out before the double-sided tape applying step.

The present process for manufacturing the present wheel balance weight can preferably further comprise the step of giving an identification mark to the other one of the opposite surfaces of the weight. For instance, when the other one of the opposite surfaces is marked with a mass of the weight, it is possible to readily identify and select a weight which has a desired mass. It is not limited, either, in terms of the way to give the identification mark to the other one of the opposite surfaces of the weight.

The process for manufacturing the present wheel balance weight can preferably further comprise the step of cutting the weight to a predetermined length. By thus cutting the weight to a predetermined length, it is possible to adapt the mass of the weight to a desired mass.

The weight cutting step can be carried out at any time as far as it is carried out after the weight forming step. However, the weight cutting step can preferably be carried out after the groove forming step is carried out. When the weight cutting step is carried out after the groove forming step, it is possible to cut the weight, which is formed of a ferrous alloy, with ease. Specifically, it is possible to cut the weight at the groove which is formed to a reduced thickness in the one of the opposite surface of the weight.

In accordance with the present manufacturing process, it is possible to manufacture the present wheel balance weight using a weight in which burrs, flashes, and the like, are inhibited. The burrs, flashes, and so on, are likely to occur on the side surfaces of the weight.

EXAMPLE

The present invention will be hereinafter described in detail with reference to a specific example.

A wheel balance according to an example of the present invention was manufactured. A manufacturing process therefor will be hereinafter described in detail with reference to FIGS. 1 through 6.

First of all, a strip-shaped iron plate 10 was cut out of a coiled raw material. The iron plate 10 had a width of 20 mm, a length of 164 mm and a thickness of 3 mm. FIG. 1 illustrates the iron plate 10.

Figure 2:
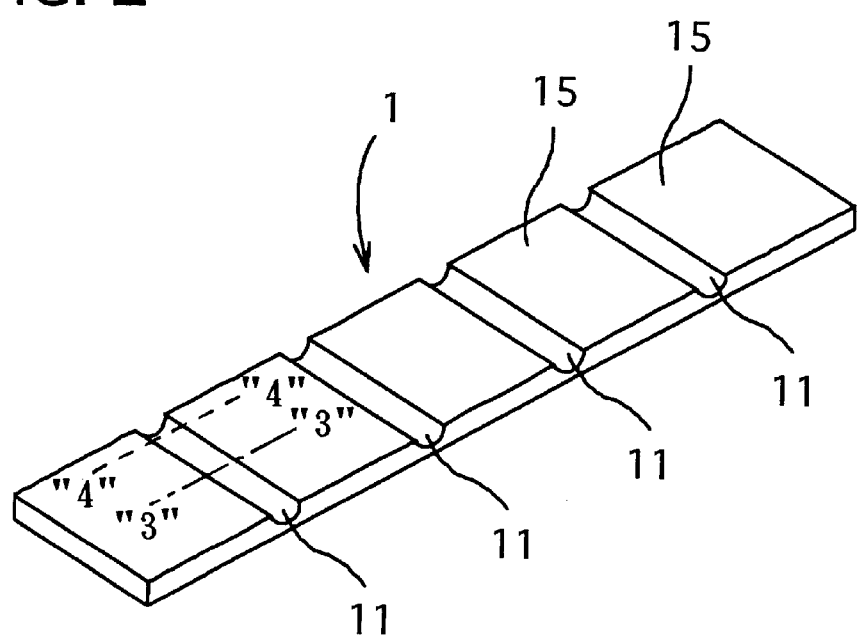
FIG. 2 is a perspective view for illustrating a weight which was used in the example of the present wheel balance weight.

Subsequently, grooves 11 were formed on one of the opposite surfaces of the thus cut-out strip-shaped iron plate 10, thereby preparing a weight 1. The grooves 10 were formed by pressing a punch onto one of the opposite surfaces of the iron plate 10. The punch had a predetermined outer configuration. The grooves 10 were formed at intervals of 23.5 mm on one of the opposite surfaces of the resulting weight 1. When the length of the weight 1 is "L" and the interval between the grooves 11 is "I," a ratio of the interval "I" with respect to the length "L" can preferably fall in a range of from 5% to 50%. The one of the opposite surfaces of the weight 1, in which the grooves 11 were formed, will be hereinafter referred to as the bottom surface. The other one of the opposite surfaces of the weight 1, in which no groove 11 was formed, will be hereinafter referred to as the top surface. FIG. 2 illustrates the weight 1 with the grooves 11 formed therein.

Figure 3:
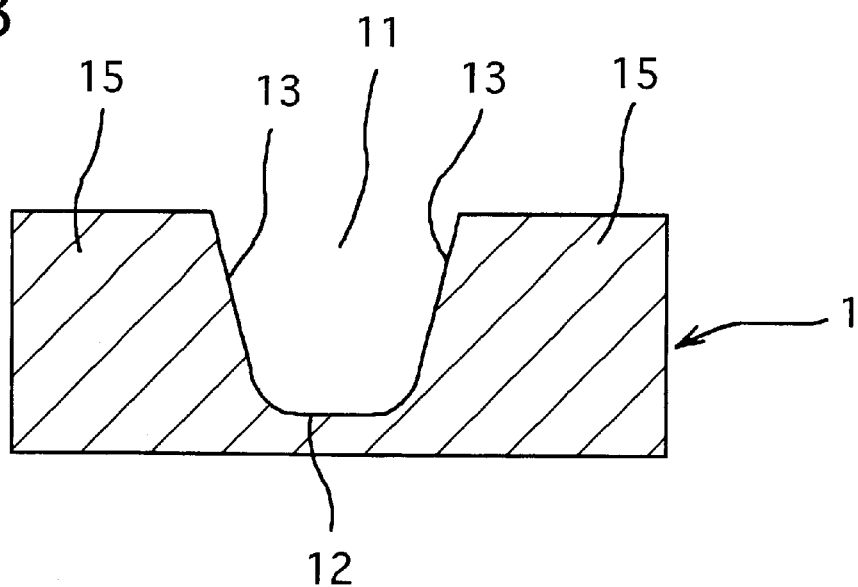
FIG. 3 is a cross sectional view, which is viewed in the direction perpendicular to the line "3"—"3" of FIG. 2, for illustrating a central portion of a groove which was formed in the weight.
Figure 4:
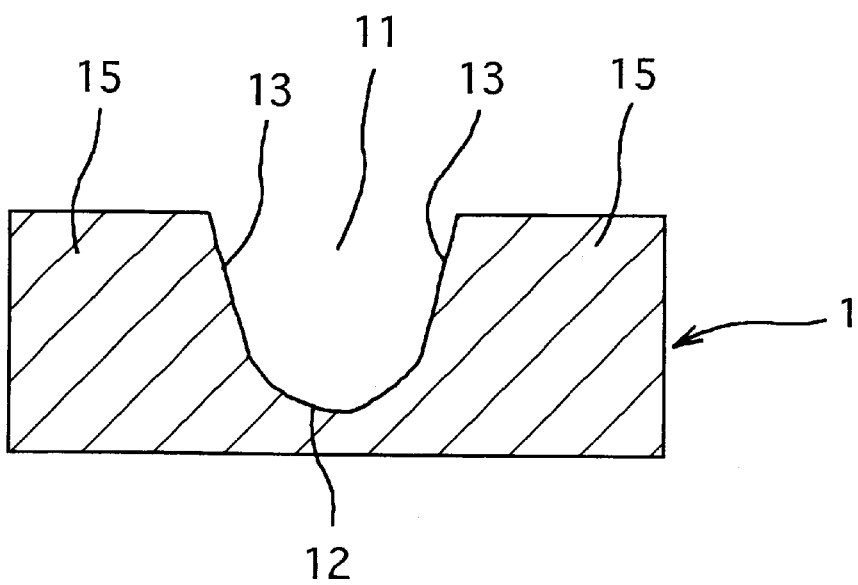
FIG. 4 is a cross sectional view, which is viewed in the direction perpendicular to the line "4"—"4" of FIG. 2, for illustrating an opposite end of the groove.

FIG. 3 and FIG. 4 illustrate the cross sectional configurations of the grooves 11 which were formed in the bottom surface of the weight 1. As illustrated in the drawings, the grooves 11 were formed so that the cross sectional configurations of the grooves 11 differ between the central portion and the opposite ends. Here, note that FIG. 3 illustrates the cross sectional configuration of the grooves 11, which is viewed in the direction perpendicular to the line "3"—"3" of FIG. 2, and FIG. 4 illustrates the cross sectional configuration of the grooves 11, which is viewed in the direction perpendicular to the line "4"—"4" of FIG. 2.

Specifically, the grooves 11 were formed as a substantially letter "U" shape which had a bottom surface 12 and side wall surfaces 13, 13. The bottom surface 12 was formed parallel to the top surface of the weight 1. The bottom surface is disposed at a depth of 2.65 mm from the bottom surface of the weight 1 into which the grooves 11 were opened. When the thickness of the weight 1 is "t" and the depth of the grooves 11 is "d," a ratio of the depth "d" with respect to the thickness "t" can preferably fall in a range of from 10% to 13%.

Moreover, at the central portion of the grooves 11, the bottom surface 12 had a length of 0.7 mm in the longitudinal direction of the weight 1. At the opposite ends of the grooves 11, the bottom surface 12 had a length of from 0.05 to 0.1 mm similarly in the longitudinal direction of the weight 1. In other words, the grooves 11 were formed so that the bottom surface 12 had a length which diminished as they extended from the central portion to the opposite ends. When the bottom surface 12 has a length of "$l_1$" at the central portion in the longitudinal direction of the weight 1 and has a length of "$l_2$" at the opposite ends in the longitudinal direction of the weight 1, a ratio of the length "$l_2$" with respect to the length "$l_1$" can preferably fall in a range of from 10% to 80%.

Figure 5:
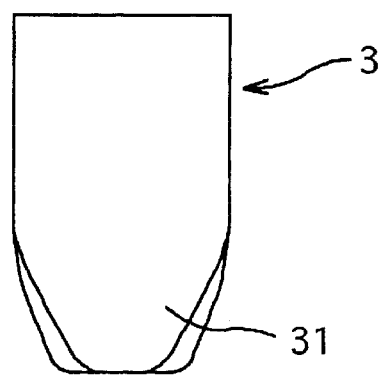
FIG. 5 is a front view for illustrating a punch which was used to form the groove.
Figure 6:
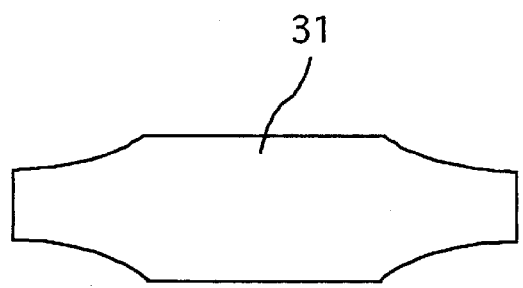
FIG. 6 is an enlarged bottom view for illustrating a leading end of a protrusion in the punch.

As illustrated in FIG. 5 and FIG. 6, the punch 3, which was used to form the grooves 11 in the bottom surface of the weight 1, had a protrusion 31 whose configuration differed between the central portion and the opposite ends at the leading end. For example, the protrusion 31 had a thickness of from 0.05 to 0.1 mm at the opposite ends and a thickness of 0.7 mm at the central portion. Thus, the protrusion 31 had a thinner thickness at the opposite ends than at the central portion. Moreover, the protrusion 31 was formed so that the thickness was thickened as it extended in the direction from the leading end of the punch 3 to the base end thereof. Here, the "opposite ends" of the protrusion 31 designate the portions of the protrusion 31 for forming the opposite ends of the grooves 11, which were formed in the bottom surface of the weight 1, and the "central portion" of the protrusion 31 designates the portion of the protrusion 31 for forming the central portion of the grooves 11, which were formed in the bottom surface of the weight 1. Moreover, the "thicknesses" of the protrusion 31 designate its thicknesses in the longitudinal direction of the weight 1 when the punch 3 is pressed onto the weight 1. Note that FIG. 5 illustrates the front view of the punch 3, and FIG. 6 illustrates the enlarged bottom view of the leading end of the protrusion 31 in the punch 3. Similarly to the lengths of the grooves 11, when the protrusion 31 has a thickness of "$t_1$" at the central portion and has a thickness of "$t_2$" at the opposite ends, a ratio of the thickness "$t_2$" with respect to the thickness "$t_1$" can preferably fall in a range of from 0% to 50%.

In the weight 1 in which the grooves 11 were formed by pressing the punch 3 onto the bottom surface, burrs, flashes, and the like, did not occur on the opposite end surfaces in the width-wise direction. Specifically, the deformation magnitude of the texture at the central portion in the iron plate 10 differed from the deformation magnitudes of the textures at the opposite ends therein. Accordingly, when the texture was moved by a plastic deformation from the central portion to the opposite ends, the textures at the opposite ends could absorb the texture, which was moved from the central portion. As a result, it was possible to inhibit the burrs, flashes, and so on, which would have protruded in the width-wise direction, from taking place.

Subsequently, the weight 1 was curved by pressing its heavy-thickness portions 15, in which the grooves 11 were not formed. The heavy-thickness portions 15 were curved so that the bottom surface of the weight 1 was curved in a convexed manner and the top surface of the weight 1 was curved in a concaved manner.

Figure 7:
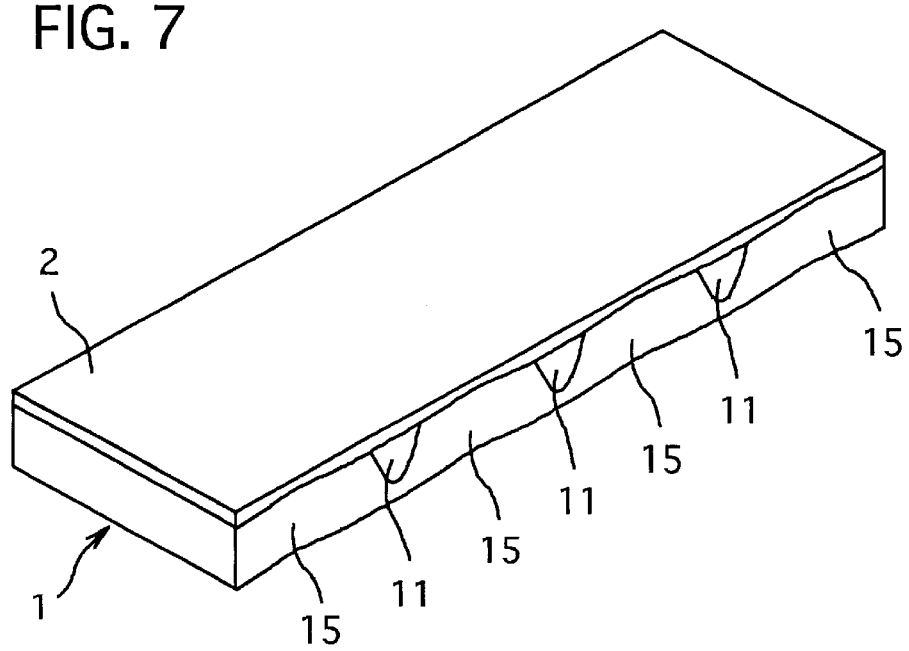
FIG. 7 is a perspective view for illustrating the example of the present wheel balance weight.

Finally, one of opposite adhesive surfaces of a double-sided tape 2 was applied onto the bottom surface of the weight 1 in which the grooves 11 were formed. FIG. 7 illustrates the thus manufactured wheel balance weight.

By the above-described manufacturing process, the wheel balance weight according to an example of the present invention was manufactured.

(Installation of Wheel Balance Weight)

The wheel balance weight according the example of the present invention could be installed to a wheel by pressing the other one of the opposite adhesive surfaces of the double-sided tape 2 onto a predetermined position in an inner peripheral surface of a rim of a wheel. Before the wheel balance weight was installed to the wheel, the wheel balance weight was adapted to have a desired mass by cutting. Note that the cutting was carried out by repeatedly folding back and forth the weight 1 so as to fracture at one of the grooves 11.

When the wheel balance weight is pressed against the inner peripheral surface of the rim of the wheel in order to install it thereto, the bottom surface of the weight 1 was subjected to an expanding stress in the longitudinal direction of the weight 1, and the top surface thereof was subjected to a compressing stress in the longitudinal direction thereof.

Due to the expanding stress, the width of the grooves 11 was widened or the bottom surface side of the weight 1. When the width of the grooves 11 was widened, the weight 1 formed a curvature which conforms to a curvature in the inner peripheral surface of the rim of the wheel. Moreover, on the top surface side of the weight 1, the weight 1 was bent at respective portions which corresponded to the bottom surface of the grooves 11.

It was possible to install the wheel balance weight in the above-described manner.

In the installation of the wheel balance weight, it was possible to readily curve the weight 1. As a result, it was possible to install the wheel balance weight to the wheel with ease.

Modified Version of Example

As a modified version of the above-described example, a wheel balance weight was manufactured in a procedure which was different from that of the example. Specifically, a wheel balance weight according to a modified version of the example was manufactured in the following manner: grooves were formed in one of the opposite surfaces of a strip-shaped iron plate, which had a width of 20 mm and a thickness of 3 mm; the iron plate was cut to a predetermined length, for instance, 164 mm; and a double-sided tape was applied to the one of the opposite surfaces of the weight in which the grooves were formed. Note that the strip-shaped plate and the double-sided tape were the same raw material members as those used in the example. Moreover, the grooves were formed on the one of the opposite surfaces of the weight in the same manner as the grooves 11 which were formed in the bottom surface of the weight 1 of the wheel balance weight according to the example.

In addition, in the wheel balance weight according to the modified version of the example, a baking zinc chromate composite film was formed on the surfaces of the weight. Note that the baking zinc chromate composite film was formed by carrying out an ordinary baking zinc chromate composite film forming process.

Similar to the wheel balance weight according to the example, it was possible as well to install the wheel balance weight according to the modified version of the example to a wheel with ease.

Having now fully described the present invention, it will be apparent to one of ordinary skill in the art that many changes and modifications can be made thereto without departing from the spirit or scope of the present invention as set forth herein including the appended claims.

What is claimed is:

1. A wheel balance weight, comprising:
    a weight being formed as a substantially strip shape, being made from a ferrous alloy, having opposite top and bottom surfaces and at least a groove, the groove being formed in the bottom surface of the weight and crossing in the width-wise direction thereof being substantially perpendicular to a longitudinal direction thereof; and
    a double-sided tape having opposite adhesive surfaces, being disposed back to back with each other, one of the opposite adhesive surfaces to be bonded onto the bottom surface of the weight, the other one of the opposite adhesive surfaces to be bonded onto an inner peripheral surface of a wheel.

2. The wheel balance weight according to claim 1, wherein the groove has a bottom surface which extends substantially parallel to the top surface of said weight.

3. The wheel balance weight according to claim 1, wherein said weight is to be curved along the inner peripheral surface of the wheel.

4. A process for manufacturing a wheel balance weight, comprising the steps of:
    forming a weight as a substantially strip shape, being made from a ferrous alloy and having opposite surfaces;
    forming a groove in one of the opposite surfaces of the resulting weight by pressing the one of the opposite surfaces thereof with a punch, the groove crossing in the width-wise direction of the weight being substantially perpendicular to a longitudinal direction thereof, wherein a plastic deformation at opposite ends of the weight in the width-wise direction thereof is less than a plastic deformation at a central portion of the weight in the width-wise direction thereof; and
    applying a double-sided tape, having opposite adhesive surfaces, to the weight so as to adhere one of the opposite adhesive surfaces onto the one of the opposite surfaces of the weight with the groove formed therein.

5. The process according to claim 4, wherein, in said groove forming step, the punch has a protrusion whose outer peripheral surface substantially conforms to an inner peripheral surface of the groove, and the protrusion has a larger thickness at a central portion thereof than a thickness at opposite ends thereof.

6. A wheel balance weight, comprising:
    a weight being formed as a substantially strip shape, being made from a ferrous alloy, having opposite top and bottom surfaces and at least a groove, the groove being formed in the bottom surface of the weight and extending partially towards the top surface and crossing in the width-wise direction thereof being substantially perpendicular to a longitudinal direction thereof; and
    a double-sided tape having opposite adhesive surfaces, being disposed back to back with each other, one of the opposite adhesive surfaces to be bonded onto the bottom surface of the weight, the other one of the opposite adhesive surfaces to be bonded onto an inner peripheral surface of a wheel.

7. The wheel balance weight according to claim 6, wherein the groove has a bottom surface which extends substantially parallel to the top surface of said weight.

8. The wheel balance weight according to claim 6, wherein said weight is to be curved along the inner peripheral surface of the wheel.

* * * * *